US007905429B2

(12) United States Patent
Somerfield et al.

(10) Patent No.: US 7,905,429 B2
(45) Date of Patent: Mar. 15, 2011

(54) DISPENSING SYSTEM AND METHOD FOR SHOWER ARM

(75) Inventors: Alan David Somerfield, Anaheim, CA (US); Thomas Jay Sandusky, El Monte, CA (US)

(73) Assignee: Water Pik, Inc., Fort Collins, CO (US)

( * ) Notice: Subject to any disclaimer, the term of this patent is extended or adjusted under 35 U.S.C. 154(b) by 885 days.

(21) Appl. No.: 11/359,992

(22) Filed: Feb. 21, 2006

(65) Prior Publication Data

US 2007/0119980 A1 May 31, 2007

Related U.S. Application Data

(60) Provisional application No. 60/727,725, filed on Oct. 18, 2005.

(51) Int. Cl.
*B05B 11/04* (2006.01)
*B01D 71/00* (2006.01)
*G05D 11/00* (2006.01)

(52) U.S. Cl. ......... 239/328; 239/312; 239/302; 239/317; 239/322; 137/101.11; 222/129.2; 222/145.5

(58) Field of Classification Search .................. 239/302, 239/305, 310, 307, 318, 322, 323, 356–379; 222/5, 83, 89, 129.2, 145.5, 399
See application file for complete search history.

(56) References Cited

U.S. PATENT DOCUMENTS 203,094 A 4/1878 Wakeman
428,023 A 5/1890 Schoff
445,250 A 1/1891 Lawless
486,986 A 11/1892 Schinke
566,410 A 8/1896 Schinke
570,405 A 10/1896 Jerguson et al.

(Continued)

FOREIGN PATENT DOCUMENTS

AU 687527 11/1996

(Continued)

OTHER PUBLICATIONS

"Showermaster 2" advertisement, Showermaster, P.O. Box 5311, Coeur d'Alene, ID 83814, as early as Jan. 1997.

*Primary Examiner* — Dinh Q Nguyen
*Assistant Examiner* — James S Hogan
(74) *Attorney, Agent, or Firm* — Dorsey & Whitney LLP

(57) ABSTRACT

Dispensing systems for dispensing one or more materials into a fluid flow conduit, during the conveyance of fluid through the conduit are configured to connect to a fluid conduit, such as a standard pipe of a shower arm and dispense a material into the water flow in the shower arm. The system includes a first tube member having a restrictor flow passage to provide a pressure differential, as fluid flows through the tube member. The pressure differential created within the restrictor passage by the fluid flow is communicated to a flask, to provide a pressure differential between the interior and the exterior of a flexible container within the flask. The pressure differential causes material within the flexible container to be drawn out and conveyed to the fluid flowing through the tube member. The flask may be connected to the first tube member, through an extension portion that is rotatable around the first tube member for convenient positioning. A quick-release connection structure may allow the flask to be connected and selectively releasable from the system.

14 Claims, 9 Drawing Sheets

U.S. PATENT DOCUMENTS

| | | | |
|---|---|---|---|
| 800,802 A | | 10/1905 | Franquist |
| 832,523 A | | 10/1906 | Andersson |
| 854,094 A | | 5/1907 | Klein |
| 926,929 A | | 7/1909 | Dusseau |
| 1,001,842 A | | 8/1911 | Greenfield |
| 1,003,037 A | | 9/1911 | Crowe |
| 1,018,143 A | | 2/1912 | Vissering |
| 1,193,302 A | | 8/1916 | Seltner |
| 1,207,380 A | | 12/1916 | Duffy |
| 1,217,254 A | | 2/1917 | Winslow |
| 1,218,895 A | | 3/1917 | Porter |
| 1,255,577 A | | 2/1918 | Berry |
| 1,260,181 A | | 3/1918 | Gamero |
| 1,276,117 A | | 8/1918 | Riebe |
| 1,284,099 A | | 11/1918 | Harris |
| 1,327,428 A | | 1/1920 | Gregory |
| 1,451,800 A | | 4/1923 | Agner |
| 1,469,528 A | | 10/1923 | Owens |
| 1,500,921 A | | 7/1924 | Bramson et al. |
| 1,560,789 A | | 11/1925 | Johnson et al. |
| 1,597,477 A | | 8/1926 | Panhorst |
| 1,692,394 A | | 11/1928 | Sundh |
| 1,695,263 A | | 12/1928 | Jacques |
| 1,724,147 A | | 8/1929 | Russell |
| 1,736,160 A | | 11/1929 | Jonsson |
| 1,754,127 A | | 4/1930 | Srulowitz |
| 1,758,115 A | | 5/1930 | Kelly |
| 1,778,658 A | | 10/1930 | Baker |
| 1,821,274 A | | 9/1931 | Plummer |
| 1,906,575 A | | 5/1933 | Goeriz |
| 2,011,446 A | | 8/1935 | Judell |
| 2,024,930 A | | 8/1935 | Judell |
| 2,044,445 A | | 6/1936 | Price et al. |
| 2,117,152 A | | 5/1938 | Crosti |
| 2,196,783 A | | 4/1940 | Shook |
| 2,197,667 A | | 4/1940 | Shook |
| 2,268,263 A | | 5/1941 | Newell et al. |
| 2,342,757 A | | 2/1944 | Roser |
| D147,258 S | | 8/1947 | Becker |
| D152,584 S | | 2/1949 | Becker |
| 2,467,954 A | | 4/1949 | Becker |
| 2,546,348 A | | 3/1951 | Schuman |
| 2,581,129 A | | 1/1952 | Muldoon |
| D166,073 S | | 3/1952 | Dunkelberger |
| 2,648,762 A | | 8/1953 | Dunkelberger |
| 2,664,271 A | | 12/1953 | Arutunoff |
| 2,676,806 A | | 4/1954 | Bachman |
| 2,679,575 A | | 5/1954 | Haberstump |
| 2,680,358 A | | 6/1954 | Zublin |
| 2,721,089 A | | 10/1955 | Shames |
| 2,759,765 A | | 8/1956 | Pawley |
| 2,776,168 A | | 1/1957 | Schweda |
| 2,825,135 A | | 3/1958 | Tilden |
| 2,873,999 A | | 2/1959 | Webb |
| 2,931,672 A | | 4/1960 | Merritt et al. |
| 2,966,311 A | | 12/1960 | Davis |
| D190,295 S | | 5/1961 | Becker |
| D192,935 S | | 5/1962 | Becker |
| 3,032,357 A | | 5/1962 | Shames et al. |
| 3,034,809 A | | 5/1962 | Greenberg |
| 3,064,998 A | | 11/1962 | Syverson |
| 3,103,723 A | | 9/1963 | Becker |
| 3,111,277 A | | 11/1963 | Grimsley |
| 3,121,235 A | | 2/1964 | Gellmann |
| 3,143,857 A | | 8/1964 | Eaton |
| 3,196,463 A | | 7/1965 | Fameth |
| 3,231,200 A | | 1/1966 | Heald |
| 3,266,059 A | | 8/1966 | Stelle |
| 3,306,634 A | | 2/1967 | Groves et al. |
| 3,329,967 A | | 7/1967 | Martinez et al. |
| 3,389,925 A | | 6/1968 | Gottschald |
| 3,393,311 A | | 7/1968 | Dahl |
| 3,393,312 A | | 7/1968 | Dahl |
| 3,402,893 A | | 9/1968 | Hindman |
| 3,492,029 A | | 1/1970 | French et al. |
| 3,546,961 A | | 12/1970 | Marton |
| 3,565,116 A | | 2/1971 | Gabin |
| 3,584,822 A | | 6/1971 | Oram |
| 3,612,577 A | | 10/1971 | Pope |
| 3,641,333 A | | 2/1972 | Gendron |
| 3,663,044 A | | 5/1972 | Contreras et al. |
| 3,669,362 A | | 6/1972 | Meyerhofer et al. |
| 3,669,470 A | | 6/1972 | Deurloo |
| 3,685,745 A | | 8/1972 | Peschcke-Koedt |
| 3,731,084 A | | 5/1973 | Trevorrow |
| 3,754,779 A | | 8/1973 | Peress |
| 3,778,610 A | | 12/1973 | Wolf |
| 3,860,271 A | | 1/1975 | Rodgers |
| 3,861,719 A | | 1/1975 | Hand |
| 3,869,151 A | | 3/1975 | Fletcher et al. |
| 3,910,277 A | | 10/1975 | Zimmer |
| D237,708 S | | 11/1975 | Grohe |
| 3,929,164 A | | 12/1975 | Richter |
| 3,931,992 A | | 1/1976 | Coel |
| D240,178 S | | 6/1976 | Johansen |
| D240,322 S | | 6/1976 | Staub |
| 3,971,074 A | | 7/1976 | Yxfeldt |
| 4,005,880 A | | 2/1977 | Anderson et al. |
| 4,006,920 A | | 2/1977 | Sadler et al. |
| 4,023,782 A | | 5/1977 | Eifer |
| 4,045,054 A | | 8/1977 | Arnold |
| D249,356 S | | 9/1978 | Nagy |
| 4,162,801 A | | 7/1979 | Kresky et al. |
| 4,174,822 A | | 11/1979 | Larsson |
| 4,243,253 A | | 1/1981 | Rogers, Jr. |
| 4,258,414 A | | 3/1981 | Sokol |
| 4,274,400 A | | 6/1981 | Baus |
| 4,282,612 A | | 8/1981 | King |
| D262,353 S | | 12/1981 | Kitson |
| 4,358,056 A | | 11/1982 | Greenhut et al. |
| D268,442 S | | 3/1983 | Darmon |
| 4,383,554 A | | 5/1983 | Merriman |
| 4,396,797 A | | 8/1983 | Sakuragi et al. |
| 4,425,965 A | | 1/1984 | Bayh, III et al. |
| 4,465,308 A | | 8/1984 | Martini |
| 4,479,610 A | | 10/1984 | Etheridge et al. |
| 4,495,550 A | | 1/1985 | Visciano |
| 4,540,202 A | | 9/1985 | Amphoux et al. |
| 4,545,081 A | | 10/1985 | Nestor et al. |
| 4,545,535 A | * | 10/1985 | Knapp .......................... 239/313 |
| 4,553,775 A | | 11/1985 | Halling |
| D281,820 S | | 12/1985 | Oba et al. |
| 4,568,216 A | | 2/1986 | Mizusawa et al. |
| 4,571,003 A | | 2/1986 | Roling et al. |
| D283,645 S | | 4/1986 | Tanaka |
| 4,643,463 A | | 2/1987 | Halling et al. |
| 4,645,244 A | | 2/1987 | Curtis |
| 4,652,025 A | | 3/1987 | Conroy, Sr. |
| 4,669,757 A | | 6/1987 | Bartholomew |
| 4,683,917 A | | 8/1987 | Bartholomew |
| 4,707,770 A | | 11/1987 | Van Duyn |
| 4,722,029 A | | 1/1988 | Ahle et al. |
| 4,733,337 A | | 3/1988 | Bieberstein |
| 4,739,801 A | | 4/1988 | Kimura et al. |
| 4,752,975 A | | 6/1988 | Yates |
| 4,790,294 A | | 12/1988 | Allred, III et al. |
| 4,809,369 A | | 3/1989 | Bowden |
| 4,839,599 A | | 6/1989 | Fischer |
| 4,842,059 A | | 6/1989 | Tomek |
| D302,325 S | | 7/1989 | Charet et al. |
| 4,850,616 A | | 7/1989 | Pava |
| 4,856,822 A | | 8/1989 | Parker |
| 4,863,328 A | | 9/1989 | Malek |
| 4,865,362 A | | 9/1989 | Holden |
| 4,871,196 A | | 10/1989 | Kingsford |
| D306,351 S | | 2/1990 | Charet et al. |
| 4,901,765 A | * | 2/1990 | Poe .............................. 137/893 |
| 4,901,927 A | | 2/1990 | Valdivia |
| 4,903,178 A | | 2/1990 | Englot et al. |
| 4,907,137 A | | 3/1990 | Schladitz et al. |
| 4,946,202 A | | 8/1990 | Perricone |
| 4,951,329 A | | 8/1990 | Shaw |
| 4,959,758 A | | 9/1990 | Filosa et al. |
| 4,964,573 A | | 10/1990 | Lipski |
| 4,972,048 A | | 11/1990 | Martin |
| 4,975,123 A | | 12/1990 | Gray |
| D314,246 S | | 1/1991 | Bache |

| | | | | | |
|---|---|---|---|---|---|
| 5,004,158 | A | | 4/1991 | Halem et al. | |
| 5,022,103 | A | | 6/1991 | Faist | |
| 5,032,015 | A | | 7/1991 | Christianson | |
| 5,033,528 | A | | 7/1991 | Volcani | |
| 5,046,764 | A | | 9/1991 | Kimura et al. | |
| D321,062 | S | | 10/1991 | Bonbright | |
| D322,681 | S | | 12/1991 | Yuen | |
| 5,071,070 | A | * | 12/1991 | Hardy | 239/311 |
| 5,086,878 | A | | 2/1992 | Swift | |
| D325,769 | S | | 4/1992 | Haug et al. | |
| 5,103,384 | A | | 4/1992 | Drohan | |
| 5,107,406 | A | | 4/1992 | Sekido et al. | |
| 5,134,251 | A | | 7/1992 | Martin | |
| 5,135,173 | A | * | 8/1992 | Cho | 239/305 |
| D329,504 | S | | 9/1992 | Yuen | |
| 5,143,123 | A | | 9/1992 | Richards et al. | |
| 5,148,556 | A | | 9/1992 | Bottoms, Jr. et al. | |
| 5,153,976 | A | | 10/1992 | Benchaar et al. | |
| 5,154,483 | A | | 10/1992 | Zeller | |
| 5,163,752 | A | | 11/1992 | Copeland et al. | |
| 5,197,767 | A | | 3/1993 | Kimura et al. | |
| 5,215,338 | A | | 6/1993 | Kimura et al. | |
| 5,220,697 | A | | 6/1993 | Birchfield | |
| D337,839 | S | | 7/1993 | Zeller | |
| D338,542 | S | | 8/1993 | Yuen | |
| 5,254,809 | A | | 10/1993 | Martin | |
| D341,220 | S | | 11/1993 | Eagan | |
| 5,263,646 | A | | 11/1993 | McCauley | |
| 5,265,833 | A | | 11/1993 | Heimann et al. | |
| 5,268,826 | A | | 12/1993 | Greene | |
| 5,276,596 | A | | 1/1994 | Krenzel | |
| 5,286,071 | A | | 2/1994 | Storage | |
| 5,288,110 | A | | 2/1994 | Allread | |
| D345,811 | S | | 4/1994 | Van Deursen et al. | |
| 5,333,787 | A | | 8/1994 | Smith et al. | |
| 5,333,789 | A | | 8/1994 | Garneys | |
| 5,340,165 | A | | 8/1994 | Sheppard | |
| 5,349,987 | A | | 9/1994 | Shieh | |
| 5,356,076 | A | * | 10/1994 | Bishop | 239/311 |
| 5,368,235 | A | | 11/1994 | Drozdoff et al. | |
| 5,369,556 | A | | 11/1994 | Zeller | |
| 5,370,427 | A | | 12/1994 | Hoelle et al. | |
| 5,385,500 | A | | 1/1995 | Schmidt | |
| D356,626 | S | | 3/1995 | Wang | |
| 5,398,977 | A | | 3/1995 | Berger et al. | |
| D361,399 | S | | 8/1995 | Carbone et al. | |
| 5,449,206 | A | | 9/1995 | Lockwood | |
| D363,360 | S | | 10/1995 | Santarsiero | |
| 5,468,057 | A | | 11/1995 | Megerle et al. | |
| D364,935 | S | | 12/1995 | deBlois | |
| D365,625 | S | | 12/1995 | Bova | |
| D365,646 | S | | 12/1995 | deBlois | |
| D366,707 | S | | 1/1996 | Kaiser | |
| D366,708 | S | | 1/1996 | Santarsiero | |
| D366,709 | S | | 1/1996 | Szymanski | |
| D366,710 | S | | 1/1996 | Szymanski | |
| 5,481,765 | A | | 1/1996 | Wang | |
| D366,948 | S | | 2/1996 | Carbone | |
| D367,333 | S | | 2/1996 | Swyst | |
| D367,934 | S | | 3/1996 | Carbone | |
| D368,146 | S | | 3/1996 | Carbone | |
| D368,317 | S | | 3/1996 | Swyst | |
| D368,539 | S | | 4/1996 | Carbone et al. | |
| D368,540 | S | | 4/1996 | Santarsiero | |
| D368,541 | S | | 4/1996 | Kaiser et al. | |
| D368,542 | S | | 4/1996 | deBlois et al. | |
| D369,873 | S | | 5/1996 | deBlois et al. | |
| D369,874 | S | | 5/1996 | Santarsiero | |
| D369,875 | S | | 5/1996 | Carbone | |
| D370,277 | S | | 5/1996 | Kaiser | |
| D370,278 | S | | 5/1996 | Nolan | |
| D370,279 | S | | 5/1996 | deBlois | |
| D370,280 | S | | 5/1996 | Kaiser | |
| D370,281 | S | | 5/1996 | Johnstone et al. | |
| 5,517,392 | A | | 5/1996 | Rousso et al. | |
| 5,521,803 | A | | 5/1996 | Eckert et al. | |
| D370,542 | S | | 6/1996 | Santarsiero | |
| D370,735 | S | | 6/1996 | DeBlois | |
| D370,987 | S | | 6/1996 | Santarsiero | |
| D370,988 | S | | 6/1996 | Santarsiero | |
| D371,448 | S | | 7/1996 | Santarsiero | |
| D371,618 | S | | 7/1996 | Nolan | |
| D371,619 | S | | 7/1996 | Szymanski | |
| D371,856 | S | | 7/1996 | Carbone | |
| D372,318 | S | | 7/1996 | Szymanski | |
| D372,319 | S | | 7/1996 | Carbone | |
| 5,531,625 | A | | 7/1996 | Zhong | |
| D372,548 | S | | 8/1996 | Carbone | |
| D372,998 | S | | 8/1996 | Carbone | |
| D373,210 | S | | 8/1996 | Santarsiero | |
| D373,434 | S | | 9/1996 | Nolan | |
| D373,435 | S | | 9/1996 | Nolan | |
| D373,645 | S | | 9/1996 | Johnstone et al. | |
| D373,646 | S | | 9/1996 | Szymanski et al. | |
| D373,647 | S | | 9/1996 | Kaiser | |
| D373,648 | S | | 9/1996 | Kaiser | |
| D373,649 | S | | 9/1996 | Carbone | |
| D373,651 | S | | 9/1996 | Szymanski | |
| D373,652 | S | | 9/1996 | Kaiser | |
| D374,297 | S | | 10/1996 | Kaiser | |
| D374,298 | S | | 10/1996 | Swyst | |
| D374,299 | S | | 10/1996 | Carbone | |
| D374,493 | S | | 10/1996 | Szymanski | |
| D374,494 | S | | 10/1996 | Santarsiero | |
| D374,732 | S | | 10/1996 | Kaiser | |
| D374,733 | S | | 10/1996 | Santarsiero | |
| 5,567,115 | A | | 10/1996 | Carbone | |
| D376,217 | S | | 12/1996 | Kaiser | |
| D376,860 | S | | 12/1996 | Santarsiero | |
| D376,861 | S | | 12/1996 | Johnstone et al. | |
| D376,862 | S | | 12/1996 | Carbone | |
| 5,624,074 | A | | 4/1997 | Parisi | |
| D379,404 | S | | 5/1997 | Spelts | |
| D381,405 | S | | 7/1997 | Waidele et al. | |
| 5,660,079 | A | | 8/1997 | Friedrich | |
| 5,667,146 | A | | 9/1997 | Pimentel et al. | |
| 5,692,252 | A | | 12/1997 | Zwezdaryk | |
| 5,749,602 | A | | 5/1998 | Delaney et al. | |
| 5,778,939 | A | | 7/1998 | Hok-Yin | |
| D401,680 | S | | 11/1998 | Tiernan | |
| 5,865,378 | A | | 2/1999 | Hollinshead et al. | |
| D406,636 | S | | 3/1999 | Male et al. | |
| D413,157 | S | | 8/1999 | Ratzlaff | |
| 5,997,047 | A | | 12/1999 | Pimentel et al. | |
| 6,042,155 | A | | 3/2000 | Lockwood | |
| 6,095,801 | A | | 8/2000 | Spiewak | |
| 6,164,569 | A | | 12/2000 | Hollinshead et al. | |
| 6,164,570 | A | | 12/2000 | Smeltzer | |
| 6,199,729 | B1 | | 3/2001 | Drzymkowski | |
| D440,641 | S | | 4/2001 | Hollinshead et al. | |
| 6,227,456 | B1 | | 5/2001 | Colman | |
| 6,425,149 | B1 | | 7/2002 | Wang | |
| 6,450,425 | B1 | | 9/2002 | Chen | |
| D465,553 | S | | 11/2002 | Singtoroj | |
| D470,219 | S | | 2/2003 | Schweitzer | |
| 6,537,455 | B2 | | 3/2003 | Farley | |
| 6,626,210 | B2 | | 9/2003 | Luettgen et al. | |
| 6,629,651 | B1 | | 10/2003 | Male et al. | |
| 6,643,862 | B2 | | 11/2003 | Aitken | |
| 6,659,117 | B2 | | 12/2003 | Gilmore | |
| 6,701,953 | B2 | | 3/2004 | Agosta | |
| D496,446 | S | | 9/2004 | Zwezdaryk | |
| D502,761 | S | | 3/2005 | Zieger et al. | |
| 6,926,212 | B1 | | 8/2005 | Glass | |
| D517,669 | S | | 3/2006 | Zieger et al. | |
| 7,066,411 | B2 | | 6/2006 | Male et al. | |
| D529,151 | S | | 9/2006 | Macan | |
| 7,147,172 | B2 | * | 12/2006 | Darling et al. | 239/302 |
| 7,201,331 | B2 | * | 4/2007 | Bertrand | 239/318 |
| 7,299,510 | B2 | | 11/2007 | Tsai | |
| 2002/0033424 | A1 | * | 3/2002 | Rivera et al. | 239/310 |
| 2002/0070292 | A1 | * | 6/2002 | Hazenfield | 239/310 |
| 2004/0163169 | A1 | | 8/2004 | Kollmann et al. | |
| 2005/0283904 | A1 | | 12/2005 | Macan et al. | |
| 2006/0231648 | A1 | | 10/2006 | Male et al. | |

FOREIGN PATENT DOCUMENTS

| | | |
|---|---|---|
| CA | 659510 | 3/1963 |
| CA | 2150317 | 11/1995 |
| DE | 352813 | 5/1922 |
| DE | 854100 | 10/1952 |
| DE | 2360534 | 6/1974 |
| DE | 2806093 | 8/1979 |
| DE | 3246327 | 12/1982 |
| DE | 4034695 | 5/1991 |
| DE | 4142198 | 4/1993 |
| DE | 19608085 | 3/1998 |
| EP | 0167063 | 6/1985 |
| EP | 0683354 | 11/1995 |
| EP | 0687851 | 12/1995 |
| EP | 0695907 | 2/1996 |
| EP | 0721082 | 7/1996 |
| FR | 538538 | 6/1922 |
| FR | 1098836 | 8/1955 |
| FR | 2596492 | 10/1987 |
| FR | 2695452 | 3/1994 |
| GB | 10086 | 5/1893 |
| GB | 3314 | 12/1914 |
| GB | 129812 | 7/1919 |
| GB | 204600 | 10/1923 |
| GB | 634483 | 3/1950 |
| GB | 971866 | 10/1964 |
| GB | 2156932 | 10/1985 |
| GB | 2298595 | 9/1996 |
| IT | 327400 | 7/1936 |
| IT | 350359 | 7/1937 |
| JP | S63-181459 | 11/1988 |
| JP | H2-78660 | 6/1990 |
| NL | 8902957 | 6/1991 |
| WO | WO93/12894 | 7/1993 |
| WO | WO93/25839 | 12/1993 |
| WO | WO96/23999 | 8/1996 |
| WO | WO98/30336 | 7/1998 |

* cited by examiner

DISPENSING SYSTEM AND METHOD FOR SHOWER ARM

CROSS-REFERENCE TO RELATED PATENT APPLICATIONS

1. Field of the Invention

The present invention relates to dispensing systems for dispensing one or more materials into a fluid flow conduit, during the conveyance of fluid through the conduit. Further embodiments relate to components of such systems and methods of making and using such systems and components. In one example embodiment, a dispensing unit is configured to connect to a standard pipe of a shower arm for dispensing one or more materials into a stream of water flowing through the shower arm. The dispensing unit may be configured to dispense one or more hair shampoo, hair conditioner, soap, skin conditioner, moisturizer, perfume, or other suitable materials or combinations thereof into the water flow in the shower arm.

2. Background of the Invention

Modern household showers are provided with one or more standard pipe shower arms connected to the household water plumbing system. A shower head is typically attached to the shower arm by screw threads provided on the shower head and mating screw threads provided on a free end of the shower arm. The mating screw threads allow the shower head to be connected to the shower arm by engaging the mating threads and rotating the shower head relative to the shower arm. Typical shower heads are configured with a balljoint that allows the showerhead to swivel around the axis of the shower arm, such that the shower head will remain oriented for proper operation, even after the ball joint has been rotated any suitable amount to attain a sufficiently tight connection to the shower arm. Other accessories also designed to be fitted to shower arms have swivels to allow the accessory to be positioned for proper operation regardless of the angular position of the threads required to achieve a liquid tight seal with shower arm.

Various types of hair shampoo, hair conditioner, soap, skin conditioner, moisturizer, perfume and other personal care products are available for use in showers. Typically, such products are distributed in plastic bottles or other containers that are kept within the shower stall. The bottles and other containers tend to collect inside of the shower stall, resulting in possible safety and health problems, as well as causing the shower to appear cluttered.

Dispensing units have been designed for installation in a shower stall, for dispensing quantities of flowable shampoos, conditioners, soaps into a user's hand. Other dispensing units that were configured to be connected in the water flow system have not gained significant popularity. It is believed that one reason for the lack of popularity of such previous dispensing systems is the difficulty of refilling such systems and of connecting such systems without changing the orientation or operation of the shower head or dispensing system. Another reason is that regulatory restrictions placed on the maximum flowrate of water through a showerhead has introduced flow controllers into the showerheads that raise the water pressure in the shower arm to a level where it is difficult for a conventional venturi system to work effectively. An example of a previous dispensing unit using a venturi system is described in U.S. Pat. No. 3,231,200, the contents of which are incorporated herein by reference.

SUMMARY OF THE INVENTION

The present invention relates to dispensing systems for dispensing one or more materials into a fluid flow conduit, during the conveyance of fluid through the conduit. In one example embodiment, a dispensing unit is configured to connect to a standard pipe of a shower arm for dispensing one or more materials into a stream of water flowing through the shower arm. The dispensing unit may be configured to dispense one or more hair shampoo, hair conditioner, soap, skin conditioner, moisturizer, perfume, or other suitable materials or combinations thereof into the water flow in the shower arm. In other embodiments, the dispensing unit may be configured to connect to a fluid conduit of another type of fluid flow system, for dispensing any suitable flowable material into a fluid flowing through the fluid conduit.

Embodiments employ a first tube member having a restrictor flow passage that is configured to provide a pressure differential, as fluid flows through the tube member. A flexible container is configured to hold a material to be dispensed into a fluid flow. The flexible container is held within a flask (of sufficient pressure-tight construction) that is connected in fluid-pressure communication to the tube member, such that the pressure differential is communicated to the flask and provided within the flask, between the interior and exterior of the flexible container.

In this manner, as fluid flows through the restrictor passage in the first tube member, the pressure differential created within the restrictor passage by the fluid flow is communicated to the flask, to provide a pressure differential between the interior and the exterior of the flexible container within the flask. The pressure differential causes material within the flexible container to be drawn out of the flexible container and conveyed to the fluid flowing through the tube member. Accordingly, material within the flexible container may be added to the fluid flowing through the tube member.

In one embodiment, the flask (and flexible container held within the flask) are connected in fluid-pressure communication with the first tube member, through an extension portion and a second tube member, where the second tube member and the extension portion are coupled to the first tube member, so as to be rotatable around the longitudinal axis of the first tube member (rotatable about the fluid flow passage through the first tube member). As a result, the flask may be readily rotated to a convenient position relative to the first tube member, such as below the first tube member, after the first tube member is installed in a fixed position to an existing standard pipe of a shower arm (or to a fluid conduit of another type of fluid-flow system).

In a further embodiment, a connection structure is provided for allowing the flask to be connected to the extension portion for operation, but selectively releasable from the extension portion by a user. A quick-release connection structure may be employed, to allow a user to selectively connect and release the flask, with a simple and fast manual operation (preferably an operation that requires only one hand of the user). In that manner, a user may quickly exchange one flask for another or replace a flask having an empty container with another flask, in a simple operation. A group or family sharing a shower facility may have two or more flasks, such that each family or group member (or sub-group) may have a corresponding flask and be able to easily exchange one flask for his or her corresponding flask, when using the shower facility.

In a further embodiment, the flexible container held within the flask may be secured to the flask cover by a connection structure that has mating members on the container and on the flask cover. The mating members may include one or more protrusions and mating grooves and/or non-circular mating shapes, such that only a flexible container having the correct configuration of one or more protrusions and grooves and/or mating shape may be coupled to a particular flask cover. By selecting a configuration of one or more protrusions and grooves and/or mating shape, a user or manufacturer may provide a level of control regarding which flexible container (and, thus, which material contained in the flexible container) may be operatively connected to a given flask.

In another embodiment, a volume control valve is provided to allow a user to selectively control the volume of material drawn from the flexible container within the flask. In yet a further embodiment, the volume control valve has an "off" position to block fluid-pressure communication between the interior of the flexible container and the fluid flow passage in the first tube member. A valve, such as a stop valve, may be provided in the extension member to automatically block fluid-pressure communication between the interior of the flask (outside of the flexible container) and the fluid flow passage in the first tube member, when the flask is removed from the extension member. In a further embodiment, the extension member my include a bypass passage and valve arrangement, for automatically causing fluid-pressure communication passages within the extension member to bypass the flask connection end of the extension member, when the flask is removed from the extension. In that manner, when a user desires to remove, replace or exchange a flask, the user may manually adjust the volume control valve to an "off" positions and then remove the flask (preferably, using a quick-release connector), to cause the stop valve to move into a block or bypass position. Upon re-connection of the flask or connection of another flask to the extension member, the stop valve is automatically moved into an open or non-bypass position. The user may then re-adjust the volume control valve, to allow operation with the re-connected or other flask.

Further embodiments employ one or more bypass passages within the first tube member, to allow fluid to bypass the restrictor flow passage and then combine with fluid exiting the restrictor flow passage. The bypass passage(s) may provide an increased fluid flow through the first tube member, relative to the fluid flow through the restrictor flow passage. As a result, fluid flow through the system need not be limited to the volume of fluid that is able to flow through the restrictor flow channel.

These and other aspects and advantages of embodiments of the invention will become apparent from the detailed description and drawings that follow.

DETAILED DESCRIPTION OF THE PREFERRED EMBODIMENTS

The present invention relates to dispensing systems for dispensing one or more materials into a fluid flow conduit, during the conveyance of fluid through the conduit. Further embodiments relate to components of such systems and methods of making and using such systems and components.

In one example embodiment, a dispensing unit is configured to connect to a standard pipe of a shower arm. The dispensing unit may be configured to dispense one or more hair shampoo, hair conditioner, soap, skin conditioner, moisturizer, medications, perfume, or other suitable materials or combinations thereof into a water flow in the shower arm. While embodiments of the present invention are described herein in the context of a shower facility having a conventional standard pipe of a shower arm that conveys water to a shower head, dispensing units according to other embodiments of the present invention may be configured to connect to other water flow pipes, hoses, supply elbows or other fluid flow systems (not limited to water) for dispensing a material into the fluid flow. For example, embodiments may be configured to dispense material into a water flow of a hose, hose bib or other suitable water source for an animal washing system (for dispensing a soap, medication, flee or other pest control substance, colorant, perfume or other materials onto a pet or other animal), a vehicle washing system (for dispensing a soap, wax, glaze or other materials onto a car, truck, boat or other vehicle), a lawn or garden dispensing system (for dispensing pesticide, herbicide, fertilizer, or other materials onto a lawn, garden, agriculture or natural area). Yet other embodiments may be configured to connect to a sink faucet for dispensing materials (soap or other suitable materials) into the water flow from the sink faucet.

Figure 1:
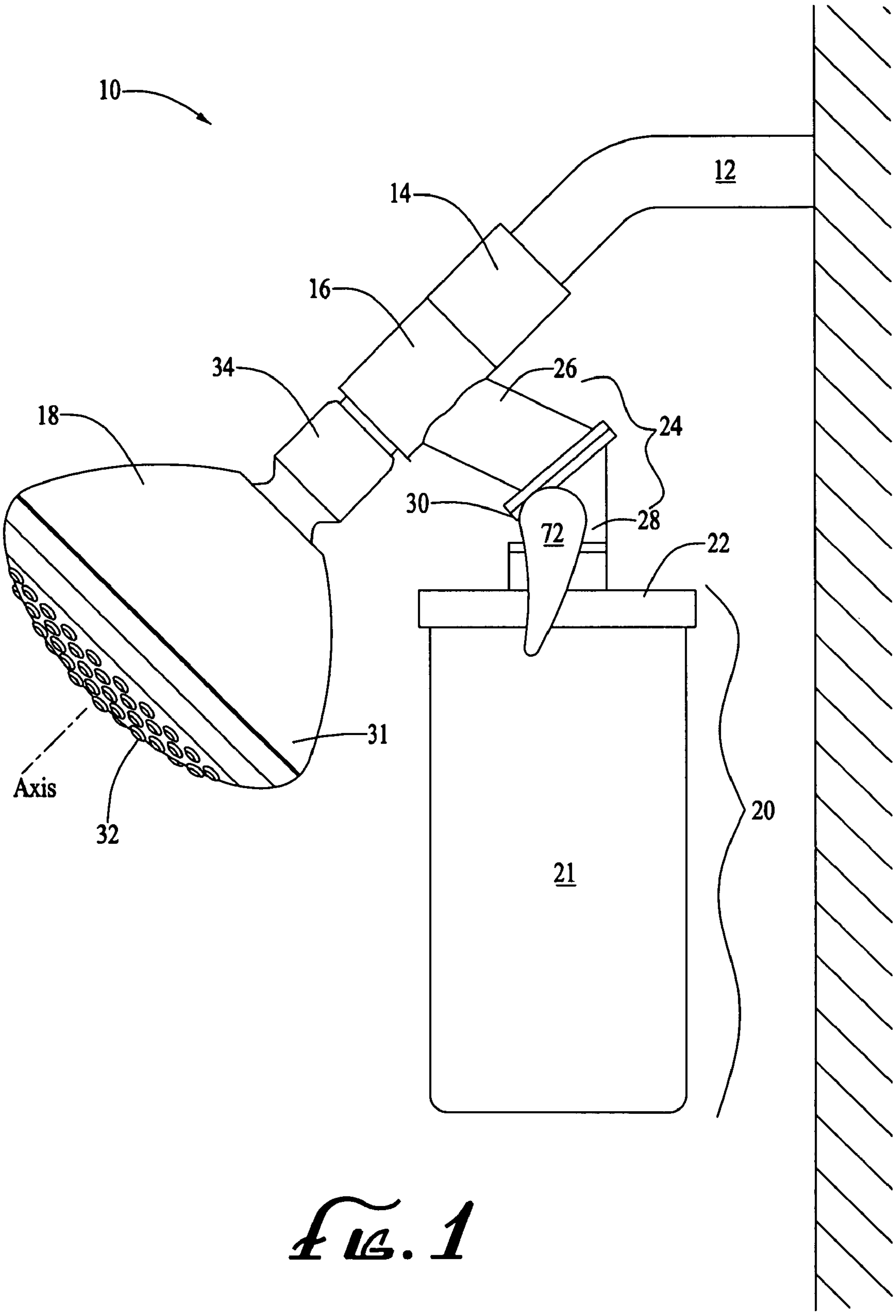
FIG. 1 is a side view of a dispensing system connected to a standard pipe of a shower arm.

An example embodiment of a dispensing system 10 is shown in FIG. 1, as connected to a standard pipe of a shower arm 12. In general, the dispensing system 10 includes a first tube member 14 configured to be connected to a free end of the shower arm 12, a second tube member 16 configured to be connected around a portion of the first tube member 14, adjacent a shower head 18. In one embodiment, the shower head 18 is part of the dispensing system 10. In a further embodiment, the shower head 18 and the shower arm 12 are part of an existing shower system, to which the dispensing system 10 is configured to connect.

The dispensing system 10 also includes a flask 20 having a flask body 21 and a flask cover 22, where the flask body and flask cover are removeably connectable to each other. One or more seals, such as, but not limited to, an O-ring seal may be provided an engaging surface of the flask cover 22 and/or the flask body 21, to enhance a fluid-tight connection between the flask cover 22 and the flask body 21. A flask connector extension structure 24 connects the flask 20 to the second tube member 16. The flask connector extension structure 24 may take any suitable form, but is shown in FIG. 1 as composed of a first extension member 26 and a second extension member 28 that are connected together at a joint 30. In the example embodiment of FIG. 1, the first extension member 26 may be formed integral, as a unitary body, with the second tube 16. However, other embodiments may include a first extension member formed separate from, but then connected to the second tube 16, Similarly, the second extension member 28 may be formed integral, as a unitary body, with the flask cover 22. However, in embodiments described herein the second extension member 28 is formed as a separate structural body relative to the flask cover 22 and is connected to the flask cover 22.

The shower head 18 may take any suitable form, including the form of a conventional shower head, but preferably includes a head member 31 having one or more nozzle outlets 32. The shower head 18 may include a ball joint 34 or other known structure that allows the head member 30 to adjust, angularly, relative to the longitudinal axis A of the first tube member 14.

An interior surface of an inlet end of the shower head 18 may be provided with threads (not shown) for connection to an end 35 of the first tube member 14. In embodiments in which the shower head 18 comprises a conventional shower head, the threads on the inlet end of the shower head 18 may be of a diameter and pitch that corresponds to that of a conventional shower arm 12. In such embodiments, the system 10 may be employed with a conventional shower head 18, for example, that was originally installed on the shower arm 12, but removed and re-installed on the end 35 of the first tube member 14. However, as described above, in other embodiments, the system 10 may include its own shower head 18 as a component of the system (instead of employing an existing shower head).

Figure 2:
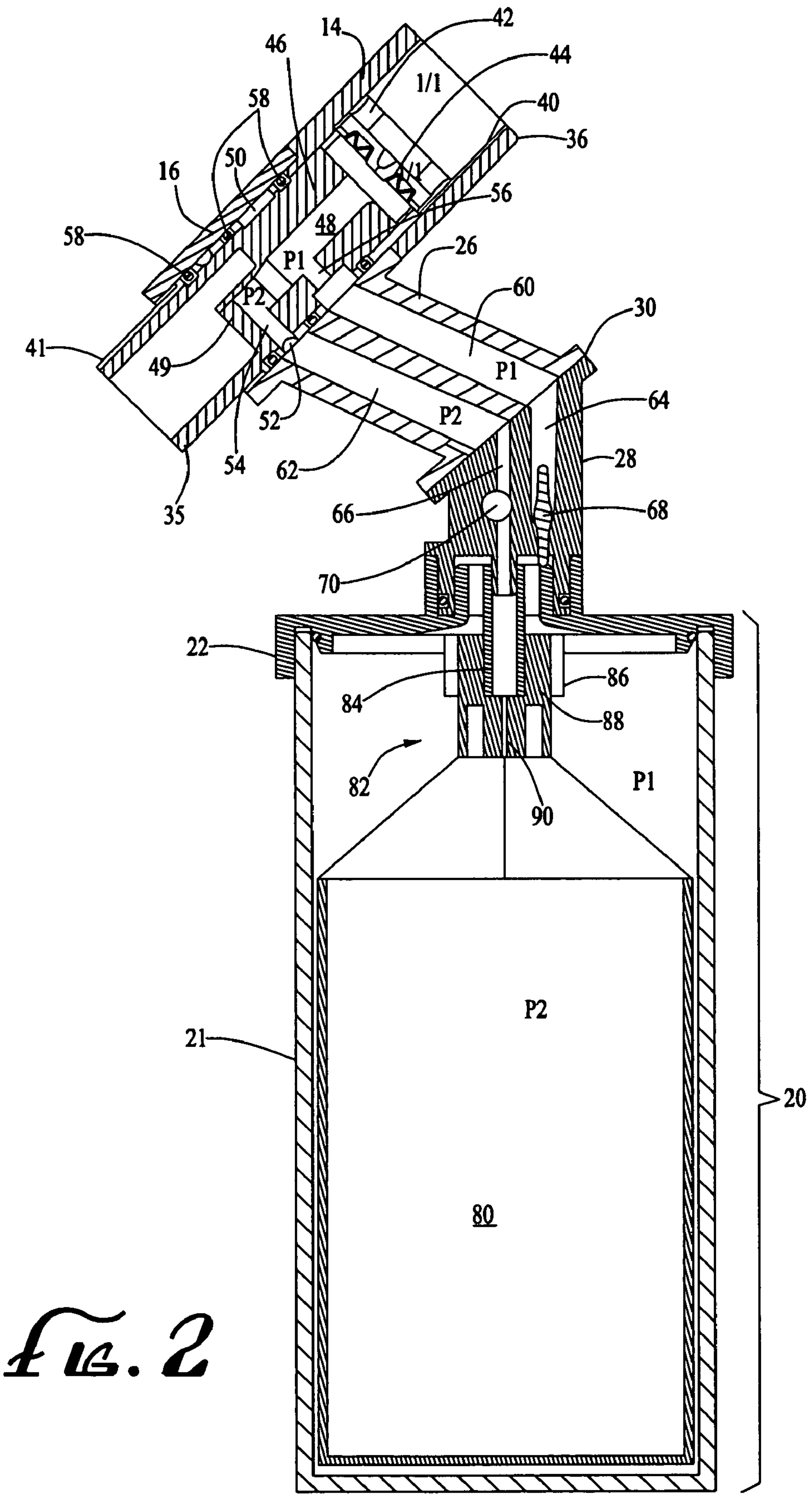
FIG. 2 is a cross-sectional view of a dispensing system according to FIG. 1.
Figure 3:
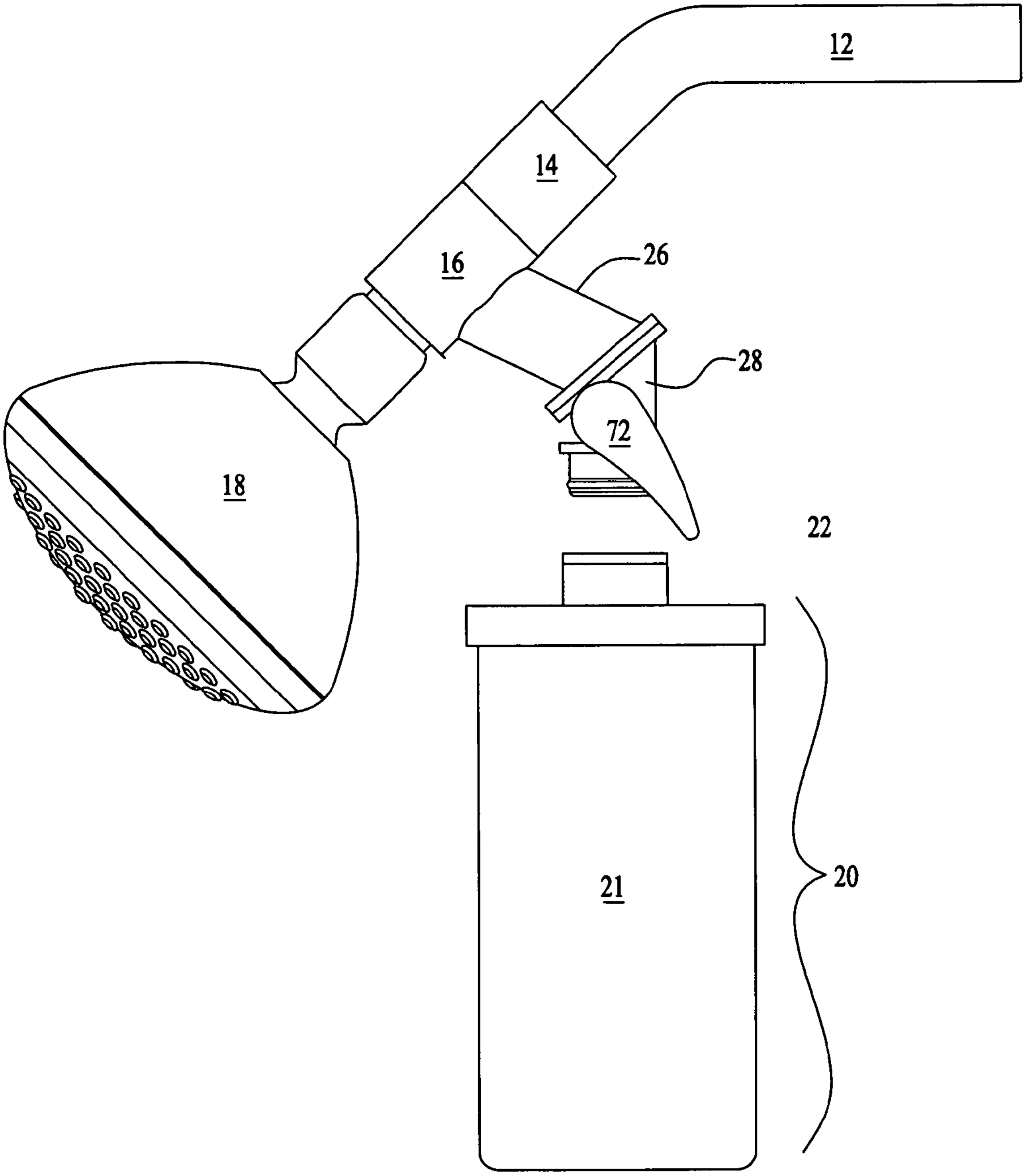
FIG. 3 is a side view of a dispensing system with a released flask.

With reference to the cross-section view shown in FIG. 2, the first tube member 14 has an end 36 for connection to the shower arm 12 (FIG. 1), opposite to the end 35 for connection to the shower head 18. The interior surface of the end 36 of the first tube member 14 is provided with threads 40 for engaging corresponding threads (not shown) on the exterior surface of the shower arm 12, for connecting the first tube member 14 to the shower arm 12. The diameter of the interior surface of the end 36 of first tube member 14 and pitch of the threads 40 are selected to provide a fluid-tight connection between the first tube member 14 and the shower arm 12. Similarly, the exterior surface of the end 35 of the first tube member 14 is provided with threads 41 for engaging corresponding threads (not shown) on the interior surface of an inlet end of the shower head 18, for connecting the first tube member 14 to the shower head 18. The diameter of the exterior surface of the end 35 of the first tube member 14 and the pitch of the threads 41 are selected to provide a fluid-tight connection between the first tube member 14 and the shower head 18.

Embodiments may include one or more seal members, such as one or more ring-shaped seals 42 at or near the threads 40 of the first tube member 14, to provide or enhance the fluid-tight connection to the shower arm 12. A back-flow preventer 44 may be located within the first tube member 14, for example, adjacent the seal 42. The back-flow preventer 44 may have any suitable configuration, including, but not limited to, a conventional diaphragm seat and rubber diaphragm or other structure arranged to operate as a one-way valve, to prevent a reverse fluid flow into the shower arm, from the shower-head side. One or more additional seal members, such as one or more ring-shaped seals (not shown) may be located in the shower head 18 and/or adjacent the end 35 of the first tube member 14, to provide or enhance the fluid-tight connection between the shower head 18 and the first tube member 14.

The first tube member 14 includes a restrictor section 46, that has an interior fluid-flow passage having an interior diameter that is reduced relative to the interior diameter at the shower arm connection end 36 of the first tube member 14. In the embodiment shown in FIG. 2, the fluid-flow passage of the restrictor section 46 includes a first diameter portion 48 and a second diameter portion 49, in series with respect to a fluid flow direction. The first diameter portion 48 is located upstream (in the fluid flow direction), closer to the shower arm connection end 36 of the first tube member 14, relative to the second diameter portion 49. The first diameter portion 48 has an interior diameter that is greater than the interior diameter of the second diameter portion 49. As shown in FIG. 2, the fluid-flow passage of the restrictor section 46 may be tapered at the connection between the first diameter portion 48 and the second diameter portion 49 and may be tapered or flared at the entrance (wherein the tapers or flares define a flow passage that decreases in diameter, in the fluid-flow direction).

The exterior surface of the restrictor section 46 of the first tube member 14 is provided with two annular grooves 50 and 52. The restrictor section 46 of the first tube member 14 also includes a first passage 56 that connects groove 50 in fluid-flow communication with the first diameter portion 48, and a second passage 54 that connects groove 52 in fluid-flow communication with the second diameter portion 49 of the fluid flow passage.

The first tube member 14 extends through the second tube member 16. The second tube member 16 has an interior diameter that is about the same or slightly larger than the outer diameter of a section of the first tube member 14, such that the second tube member 16 may be arranged coaxially with the first tube member and rotatable relative to the interior of the first tube member 14, upon an application of a sufficient rotational force on the second tube member 16.

One or more seal members 58, such as annular ring seals, may be arranged around the outer diameter of the first tube member 14 and/or the inner diameter of the second tube member 16, to provide a fluid-tight seal between first passage 56 and second passage 54 and enhance frictional engagement between the first tube member 14 and the second tube member 16. Annular seal grooves may be provided around the outer surface of the first tube member 14 and/or the inner surface of the second tube member 16 for receiving the one or more seal members 58.

In one example embodiment, sufficient frictional force between the first and second tube members 14 and 16 inhibits rotation of the second tube member 16 relative to the first tube member 14, unless a user applies a rotational force above a threshold amount (sufficient to release a frictional engagement between the first and second tube members 14 and 16) to the second tube member, for example, by gripping the second tube member 16 and rotating it about the axis A of the first tube member 14. Alternatively, or in addition, the frictional force between the first and second tube members 14 and 16 may be designed to be overcome by the weight of (and gravitational pull on) the flask 20, so that the flask 20 orients itself, by gravity, to a position below the first tube member 14, as shown in FIG. 1.

The first extension member 26 comprises a tube-shaped structure that extends from a side of the second tube member 16. The first extension member 26 includes first and second fluid passages 60 and 62 arranged in fluid-flow communication with the annular grooves 50 and 52, respectively. In embodiments as shown in FIG. 2, in which the first extension member 26 is integral (as a unitary body) with the second tube member 16, the passages 60 and 62 extend directly to the annular grooves 50 and 52, respectively. However, in embodiments in which the first extension member is formed as a separate structural element relative to the second tube member, the second tube member 16 is provided with two openings on one end, that align with the passages 60 and 62, respectively, and that complete the fluid flow path between the passages 60 and 62 and the grooves 50 and 52, respectively. The annular grooves 50 and 52 allow the second tube member 16 and first extension member 26 to rotate relative to the first tube member 14, while maintaining a fluid flow path between the portions 48 and 49 of the fluid flow path within the first tube member 14 and the fluid passages 60 and 62 in the first extension member 26.

The second extension member 28 comprises a tube-shaped structure that is connected to an end of the first extension member 26 at a fluid-tight joint 30. Each of the first and second extension members 26 and 28 may have an annular lip at the joint 30, to assist in their interconnection. The annular lips of the first and second extension members 26 and 28 may be connected by any suitable connection structure, including, but not limited to welds, adhesives, rubber seals or the like.

The second extension member 28 has first and second fluid passages 64 and 66 that align, in fluid flow communication with the first and second fluid passages 60 and 62 in the first extension member 26. In this manner, the second extension member 28 may be formed separately from the first extension member 26, for example, as a manufacturing expedient. However, in other embodiments, the second extension member 28 may be formed integral, as a unitary body, with the first extension member 26. In yet further embodiments, the second extension member 28, the first extension member 26 and the second tube member 16, all may be formed integrally, as a unitary body. However, manufacturing efficiencies may be achieved by forming, at least the second extension member 28 as a separate structural element relative to the first extension member 26. In particular the second extension member 28 includes one or more control valves and other structural features that may employ more complex manufacturing techniques or facilities than would be required for other portions of the dispensing system.

The second extension member 28 preferably includes a stop valve 68 in the first fluid passage 64. The stop valve 68 comprises a check valve or other suitable structure that allows fluid flow through the first fluid passage 64 when the flask 20 (with flask cover 22) is properly attached to the second extension member 28, and inhibits fluid flow out of the first fluid passage 64 in the event that the flask 20 (with flask cover) is removed from (or otherwise not attached to) the second extension member 28. An example embodiment of a stop valve 68 is described in further detail below.

The second extension member 28 also includes a volume control valve 70 in the second fluid passage 66. The volume control valve 70 may comprise any suitable adjustable fluid flow restriction valve that allows for adjustable control of a fluid flow rate in the second fluid passage, for example, by adjusting the cross-sectional area of the second fluid passage. In example embodiments, the volume control valve 70 may include a manual actuator 72 (FIG. 1), for allowing manual adjustment of the a fluid flow rate of fluid through the second fluid passage 66. In the embodiment shown in FIG. 1, the manual actuator 72 comprises a lever that is pivotally movable by a user to adjust the cross-sectional area of the second fluid passage 66, dependent upon the pivotal position of the lever. However, in other embodiments, another suitable volume flow control valve structure may be employed for valve 70.

In some example embodiments, the flask 20 (with the flask cover 22) is attached to the second extension member 28 with a quick-release attachment structure, that allows that flask 20 (with flask cover 22) to be quickly and easily attached and detached from the second extension member 28, by a simple manual operation. In FIG. 2, an example embodiment of a quick release structure comprises threaded structures on the second extension member 28 and the flask cover 22 for allowing attachment by engaging the threaded structures and manually rotating the flask 20 in a first direction about the longitudinal axis of the second extension member 28, and disengagement by rotating the flask 20 in a second direction (opposite the first direction) and disengaging the flask 20 from the second extension member 28. In particular, the second extension member 28 may include a threaded end, for example, having eternally-facing threads, opposite to the end that is connected to the first extension member 26. Similarly, the flask cover 22 may include a threaded open end, for example, having inner-facing threads for engaging the outer-facing threads of the second extension member 28. In other embodiments, the externally-facing threads may be formed on the flask cover and inner-facing threads may be formed on the extension member 28. The threads on the second extension member 28 and the flask cover 22 may have a sufficient length and pitch to provide a suitable sealing function, while allowing the flask 20 to be quickly and easily attached to and detached from the second extension member with minimal rotation (for example, a rotation of about 180 degrees).

In other embodiments, other suitable quick-release attachment structures may be employed in place of threaded structures shown in FIG. 2. For example, any one or combination of a quick release clamp structure for clamping an end of the second extension member 28 to an opening end of the flask cover 22, or a slide connection in which the flask 20 slides into place may be employed. For example, an annular rim or lip (not shown) may be included on the connection ends of each of the flask cover 22 and the second extension member 28, for allowing one or more quick-release clamps (not shown) to grip and hold the annular rims or lips together, and be releasable by a user, to detach the flask 20 from the second extension member 28.

Figure 4:
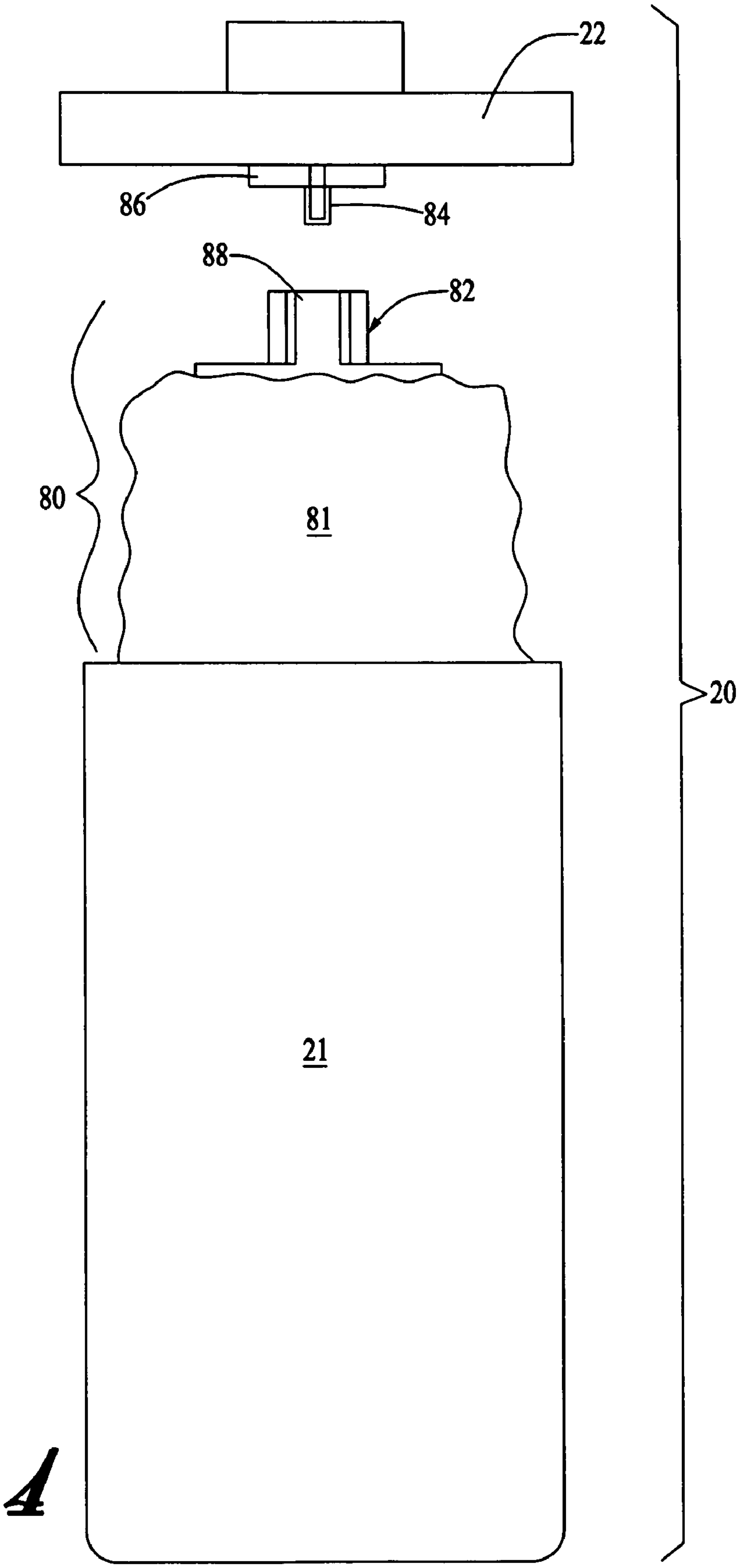
FIG. 4 is a partially exploded view of a flask for a dispensing system of FIG. 1.

The flask 20 may be configured to hold a replaceable container 80 that contains a dispensable material. The replaceable container 80 may comprise a deformable bag, pouch, accordion-shaped structure, or the like, that is able to hold a fluid material and deform in response to a pressure differential (between pressure inside of the container 80 and pressure outside of the container 80) as fluid material is dispensed from the container 80. As shown in FIG. 4, the replaceable container 80 may comprise a bag or pouch 81 made of a flexible, non-porous material, such as a plastic, metal foil, or other suitable material for containing a fluid. The replaceable container 80 in FIG. 4 includes a connector 82 for releasably connecting the container 80 to the flask cover 22. The connector 82 may be made of a relatively rigid material, such as, but not limited to, a plastic, metal, ceramic or composite material. The connector 82 is connected to the bag portion 81 of the replaceable container 80, in a fluid-tight connection. The connector 82 and flask cover 22 may be configured to allow for a quick and easy manual connection and disconnection of the connector 82 and the flask cover 22.

As shown in FIG. 2, the flask cover 22 may include a hollow first connection tube 84 that protrudes outward from one end of the cover 22 and is shaped to be received within a recess provided within the connector 82. The outside diameter of the connection tube 84 and the inside diameter of the recess in the connector 82 may be selected to provide a friction and fluid tight fit between the two parts, such that a user may readily fit the connector 82 onto the connection tube 84, for a relatively secure connection, and may remove the connector 82 from the connection tube by pulling the connector 82 away from the connection tube, against the frictional engagement.

The flask cover 22 may also include a second connection tube 86, extending coaxially with at least a portion of the length of the first connection tube 84. The second connection tube 86 has an open end and an open interior configured to receive an end portion 88 of the connector 82. The end portion 88 of the connector 82 is shaped to fit within the open end of the second connection tube 86. The inside diameter of the second connection tube 86 and the outside diameter of the end portion 88 of the connector 82 may be selected to provide a friction fit between the two parts, such that a user may readily fit the connector 82 onto the second connection tube 86, for a relatively secure connection, and may remove the connector 82 from the second connection tube 86 by pulling the connector 82 away from the connection tube, against the frictional engagement.

In preferred embodiments, the shape of the exterior surface of the end portion 88 of the connector 82 and the interior surface of the second connection tube 86 may be selected to allow the end portion 88 of the connector 82 to be inserted into the open end of the second connection tube 86, when the end portion 88 is oriented in one particular orientation (or one of a plurality of specific orientations) relative to the second connection tube 86. In one embodiment, the cross-sectional shape of the end portion 88 of the connector 82 (viewed in the direction perpendicular to the plane of the page in FIGS. 2 and 4) may be non-circular, but may have other shapes such as, but not limited to, oval, triangle, square, other polygon, or the like, that correspond to a similar-shaped interior surface of the second connection tube 86. In yet further embodiments, the cross-sectional shape of the end portion 88 may include protrusions or extensions (such as keys) that engage corresponding grooves within the second connection tube 86. Alternatively, or in addition, the end portion 88 of the connector 82 may include grooves that engage corresponding protrusions or extensions (such as keys) on the interior surface of the second connection tube 86.

With such configurations, the connector 82 may be designed to mate with and connect to the second connection tube 86, but only when the connector 82 is oriented such that the shape of the end portion 88 is aligned with a corresponding shape features of the interior surface of the second connection tube 86. Furthermore, the shape of the interior surface of the second connection tube 86 may be configured to mate with only certain types of connectors 82 (for example, connectors on a particular type or style of replaceable container 80, such as containers 80 made by a particular manufacturer or containers 80 that contain a particular type of fluid material, or the like). In further embodiments, the end portion 88 of the connector 82 may have a shaped hollow tube, while the cover 22 may include a shaped extension member (instead of a second connection tube 86) for fitting within and mating with the hollow tube shaped end portion 88, in a similar manner as discussed above with respect to the mating engagement of the end portion 88 and the second connection tube 86.

The connector 82 may include a fluid flow passage 90, connecting the recess in the connector 82 in fluid flow communication with the interior of the bag portion 81 of the replaceable container 80. The length and diameter of the fluid flow passage 86 may be selected, based on the viscosity of the fluid held within the bag portion 81, to restrict fluid flow and to allow a controlled flow of fluid from the bag portion 81, through the hollow tube 84 and through the fluid passages 66 and 62, to the small diameter portion 49 of the first tube member 14. By selecting the length and diameter of the fluid flow passage 86 appropriately, the volume of fluid that is drawn from the replaceable container 80 over a given period of time may be limited to a selected, controlled volume.

Figure 5:
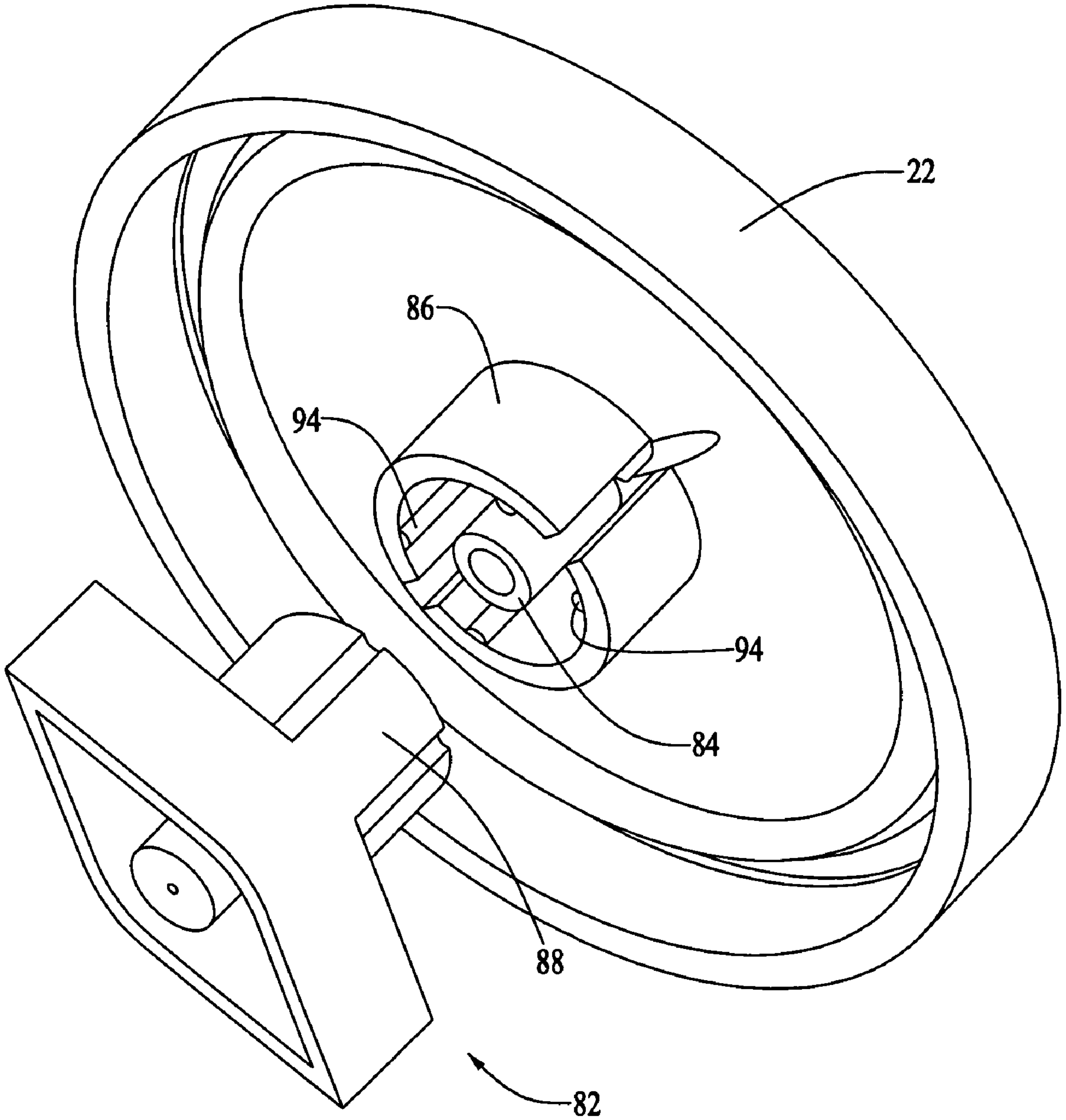
FIG. 5 is a perspective view of a connector and a flask cover for a dispensing system of FIG. 1.

An example embodiment of a shaped end portion 88 of the connector 82 and a correspondingly shaped second connection tube 86 is shown in FIG. 5. With reference to the embodiment in FIG. 5, the end portion 88 of the connector 82 includes grooves 92 arranged to engage with corresponding protrusions (in the form of ribs) 94 on the interior surface of the second connection tube 86. Accordingly, the end portion 88 of the connector 82 in FIG. 5 may engage and fit within the second connecting tube 86, only when the grooves 92 on the connector align with protrusions 94 on the second connection tube.

When the end portion 88 of the connector 82 is fully inserted within and properly engaged with the second connecting tube 86, as shown in FIG. 2, a fluid flow communication path is provided from the bag portion 81 of the disposable container 80, through the passage 90 in the connector 82, through the interior of the first connection tube 84, through the fluid passages 66 and 62 and into the small diameter portion 49 of the first tube member 14.

Figure 6:
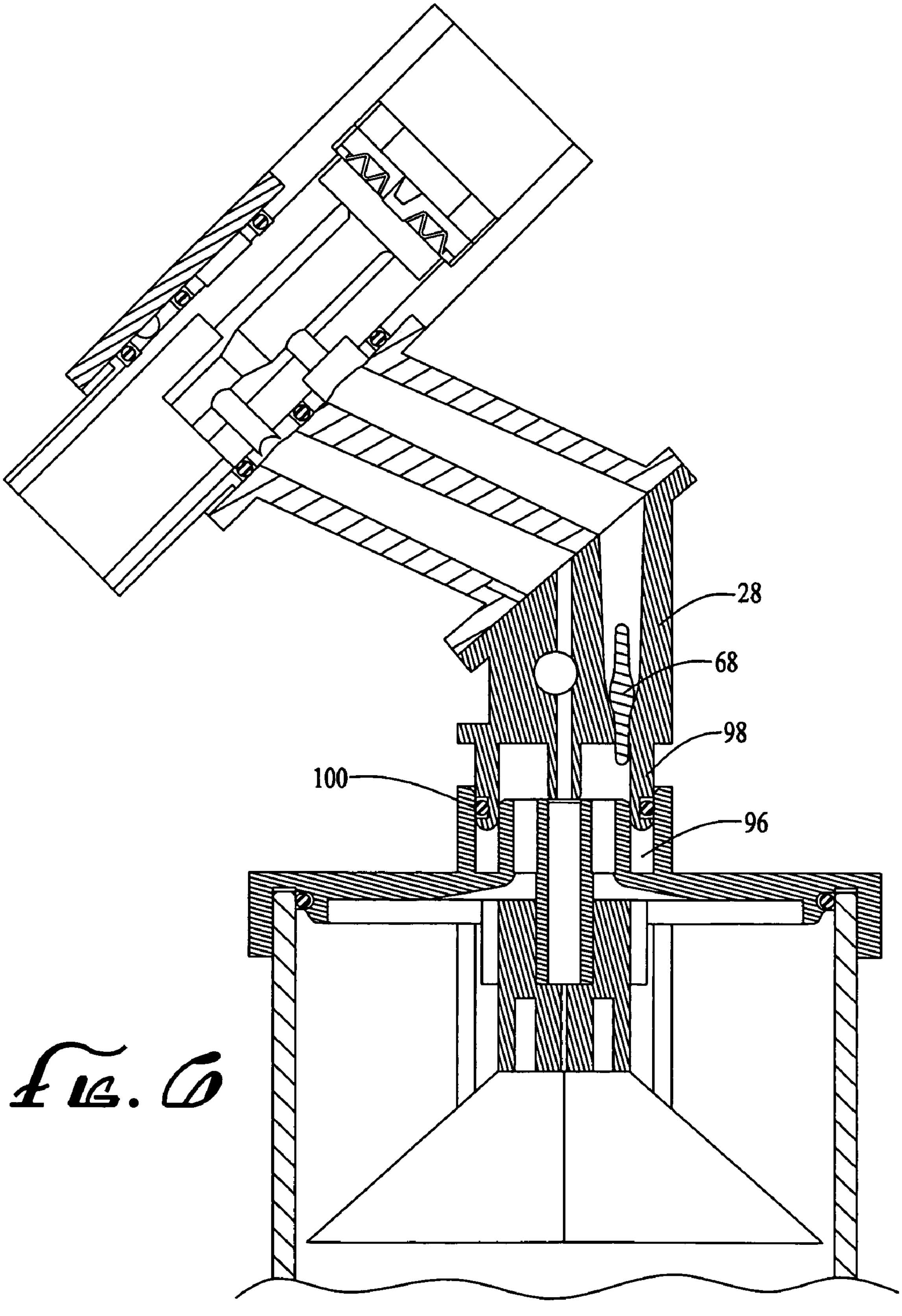
FIG. 6 is a cross-section view of a portion of a dispensing system according to FIG. 1, with the flask partially removed from the second extension member.
Figure 7:
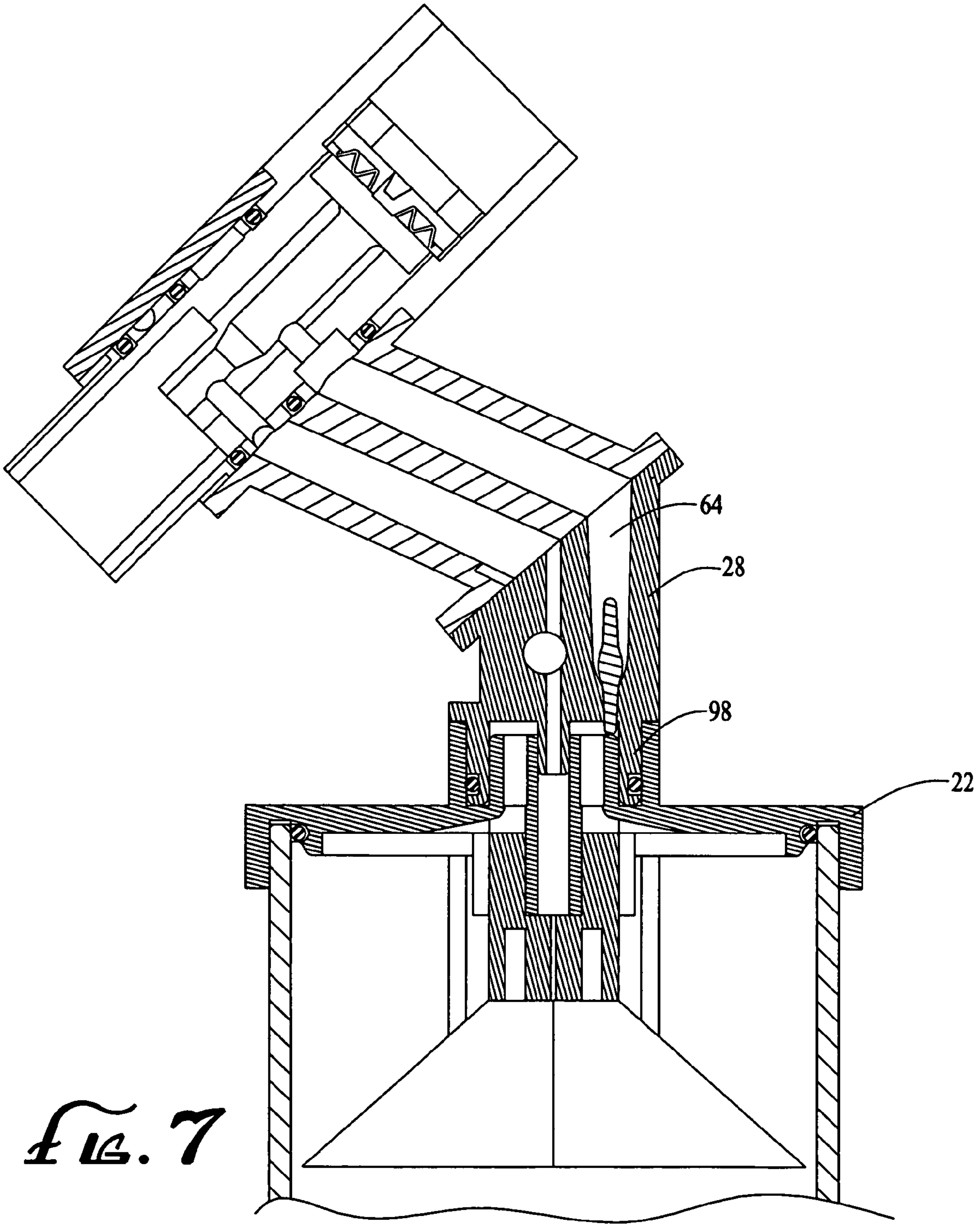
FIG. 7 is a cross-section view of a portion of a dispensing system according to FIG. 1, with the flask fully connected to the second extension member.

As discussed above, the flask cover 22 is configured to attach to one end of the second extension member 28. As shown in FIGS. 6 and 7, the flask cover 22 may be provided with and annular groove 96 having a shape and diameter that corresponds to the shape and diameter of an end portion 98 of the second extension member 28. One or more seals 100, such as but not limited to, O-ring seals, may be provided around the exterior surface of the end portion 98 of the second extension member and/or the interior surface of the annular groove 96, to enhance a fluid-tight connection between the end portion 98 and the flask cover 22. Alternatively, or in addition, one or more further seals (not shown), such as, but not limited to O-ring seals may be provided around the exterior surface of the first connection tube 84 and/or the interior surface of the mating recess of the connector 82, to enhance a fluid-tight connection between the end portion 98 and the flask cover 22. In FIG. 6, the flask cover 22 is shown as being partially, but not fully engaged with the end portion 98 of the second extension member 28. In FIG. 7, the flask cover 22 is shown as being fully engaged with the end portion 98 of the second extension member 28.

As discussed above, the second extension member 28 may include a stop valve 68 in first fluid passage 64. The stop valve 68 comprises a check valve or other suitable structure that allows fluid flow through the first fluid passage 64 when the flask 20 (with flask cover 22) is properly attached to the second extension member 28, and inhibits fluid flow out of the first fluid passage 64, in the event that the flask 20 (with flask cover) is removed from (or otherwise not attached to) the second extension member 28. The volume control valve 70 may include an "off" state (to fully block fluid communication through the passages 62 and 66), for example, corresponding to a predefined position of the volume control knob 72 (such as, but not limited to, a position in which the volume control knob 72 is manually rotated to an end-of-rotation position in the clockwise direction or, alternatively, to an end-of-rotation position in the counter-clockwise direction). In the fully engaged orientation shown in FIG. 7, a check valve member 68 is shown as being engaged with an end of the flask cover 22, such that the valve member 68 is pushed upward (relative to the orientation in FIG. 7) within the fluid passage 64.

In the upward orientation of FIG. 7, the valve member 68 is positioned to allow fluid to pass around the valve member 68, so as to provide a fluid communication from the large diameter portion 48 of the first tube member 14, through the passages 60 and 64 and to the volume in the interior area 102 of the flask (but exterior to the replaceable container 80). However, when the flask cover 22 is removed (or partially removed, as shown in FIG. 6) from the second extension member 28, the valve member 68 is forced by gravity, water pressure and/or a spring or other biasing member (not shown) into a position in which it blocks fluid communication from the passage 64 in the second extension member 28 to the interior of the flask 20. The valve member 68 may be formed of any suitable material, including, but not limited to a resilient rubber, plastic or composite material, a rigid plastic, metal, ceramic or composite material, or the like.

In an alternative embodiment, the valve member 68 may be arranged to open a bypass passage (an example of which is described below with respect to FIGS. 9 and 10) between the passages 64 and 66 when it is moved into a position to a closed position (i.e., the position described with reference to FIG. 6) and to close the bypass passage when the valve member is moved into the open position (i.e., the position described with reference to FIG. 7). In that manner, when the valve member 68 is in the closed position, fluid may be conveyed through a portion of the passage 64, to the bypass passage, through the bypass passage to the passage 66 and back through the passage 64 to the small diameter portion 49 of the first tube member 14.

According to the embodiments described above, the first tube member 14 is connected to a standard pipe 12 of a shower arm. A shower head 18 is also connected to the first tube member. When water is caused to flow through the standard pipe 12, toward the shower head 18, the water flows past the back-flow preventer 44 and into the large diameter portion 48 of the first tube member 14.

The water flows from the large diameter portion 48 into the small diameter portion 49 of the restrictor tube section of the first tube member 14. A venturi effect is created between the large diameter portion 48 and the small diameter portion 49. As a result, a first fluid pressure P1 is provided in the large diameter portion 48 and a second fluid pressure P2 is provided in the small diameter portion 49. The second fluid pressure P2 is less than the first fluid pressure P1, due to the smaller diameter of the small diameter portion 49, relative to the diameter of the large diameter portion 48.

When the flask 20 (with cover 22 and container 80) is fully connected to the second extension member 28 (and the valve 68 is, thereby, opened), fluid communication is allowed from the large diameter portion 48 of the first tube member 14, through passage 56 and groove 50, through the passages 60 and 64, to the interior of the flask 20 (but exterior to the replaceable container 80). As a result, the pressure P1 is communicated through the passages 60 and 64 and to the interior of the flask 20 (but exterior to the replaceable container 80). At the same time, fluid communication is allowed between the interior of the replaceable container 80, through the passages 66 and 62, and through groove 52 and passage 54, to the small diameter portion 49 of the first tube member 14. As a result, the interior of the replaceable container 80 will be at the same pressure P2 as the small diameter portion 49 of the first tube member 14. In this manner, the pressure P1 within the flask 20 (but exterior to the replaceable container 80) is greater than the pressure P2 within the replaceable container 80.

Thus, by selecting the diameters of the small and large diameter portions 49 and 48 to provide a suitable pressure differential (P1–P2) when water flows through the first tube member 14 from the standard pipe 12, a suitable pressure may be applied to the exterior of the flexible bag portion 81 of the container 80, to compress the flexible bag portion and force fluid contained within the flexible bag portion out of the container 80, through the fluid flow passage 90, through the first connection tube 84, through the passages 66 and 62 and into the small diameter portion 49 of the first tube member. The fluid forced from the flexible bag, into the small diameter portion 49 is, thus, mixed with water flowing through the small diameter portion 49 and conveyed, with the water flow, to the shower head 18. In this manner, fluid from the container 80 may be mixed with the water flow in the first tube member 14 and the mixed water and fluid from the container 80 is expelled through the nozzles 32 of the shower head 18.

The container 80 may be filled with a fluid, such as a fluid soap, shampoo, hair or body conditioner, medication, or other suitable material for mixing with water and expelling from a shower head. The user may adjust the volume of fluid flowing from the container 80, into the fluid flow, by adjusting the position of the volume control knob 72. The user may readily replace an empty container (or replace one container with another container containing different material) by simply removing the flask 20 from the second extension member 28, opening the flask cover 22, removing the existing container 80 from the flask cover 22 and attaching another container 80 to the flask cover 22, replacing the cover 22 on the flask body 21 and re-attaching the flask 20 to the second extension member 28, as described above. Alternatively, a user may have more than one flasks 20, each holding a container 80 containing mutually different materials, such that the user may change dispensing materials by simply replacing a flask attached to the second extension member 28 with another flask.

Figure 8:
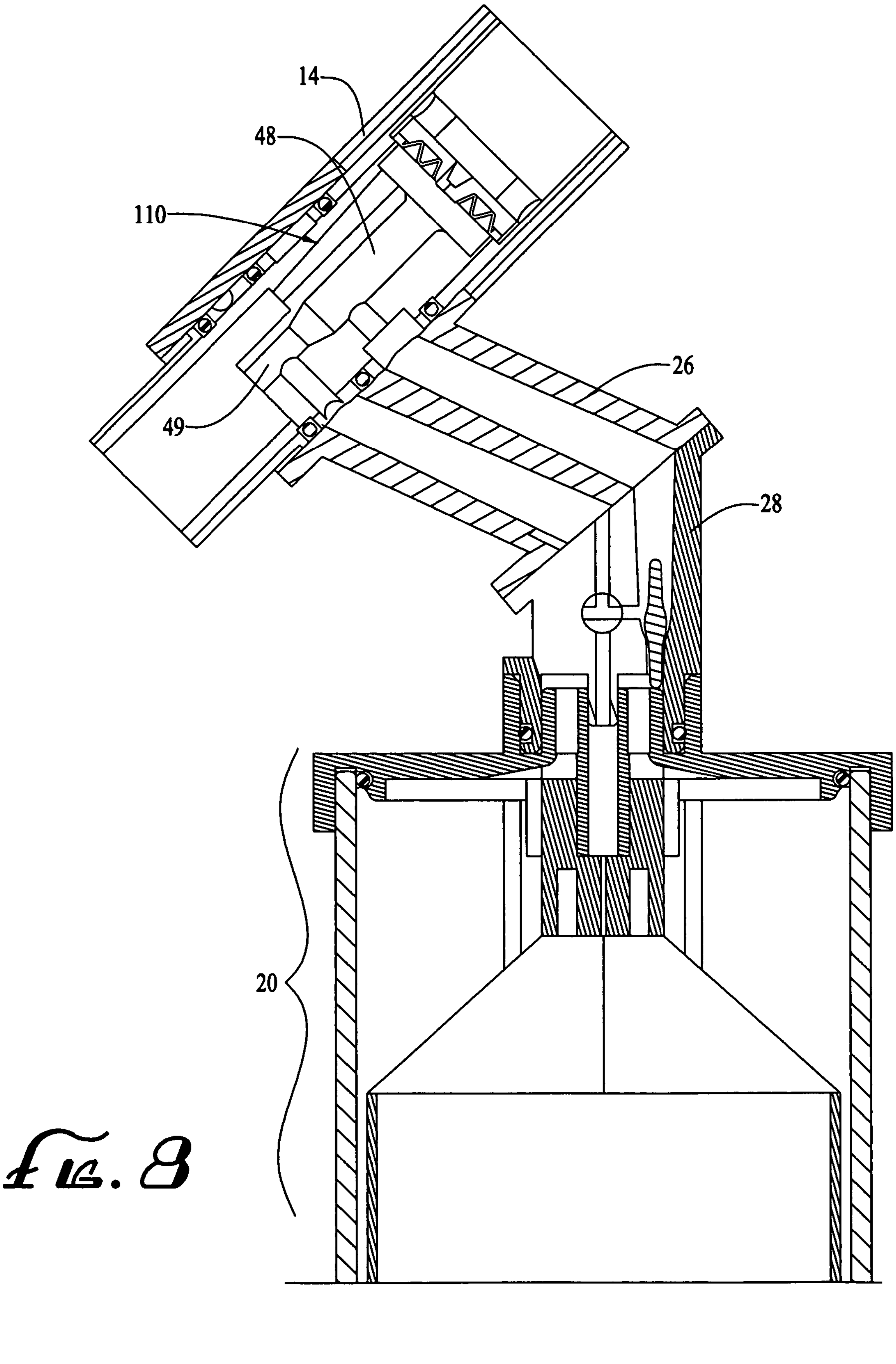
FIG. 8 is a cross-section view of a portion of a dispensing system according to a further embodiment.

A further embodiment is shown in FIG. 8, wherein at least one (and preferably, a plurality) of bypass channels are provided within the first tube member 14, to allow a portion of the water flow to bypass the large and small diameter portions 48 and 49 of the restrictor tube section 46 of the first tube member 14. In the drawing in FIG. 8, a single bypass channel 110 is shown. However, in further embodiments, plural bypass channels are arranged in spaced relationships around the large and small diameter portions 48 and 49. For example, three bypass channels 110 may be arranged around the large and small diameter portions 48 and 49, and spaced apart at 120 degree intervals. The number of channels and the diameters of the bypass channels may be selected to provide a desired bypass volume. In one example embodiment, three bypass channels, each having a diameter of about 0.1 inch may be employed. However, other embodiments may employ other suitable channel numbers and diameters.

By employing one or more bypass channels, the volume of water reaching the shower head 18 may be increased (relative to embodiments in which water only flows through the large and small diameter portions 48 and 49 of the restrictor section 46 of the first tube member 14. In particular, the restricted flow of water through the large and small diameter portions 48 and 49 and resulting venturi effect may create an undesirable reduction in flow volume to the shower head. The bypass channels provide an additional flow of water to the shower head.

Figure 9:
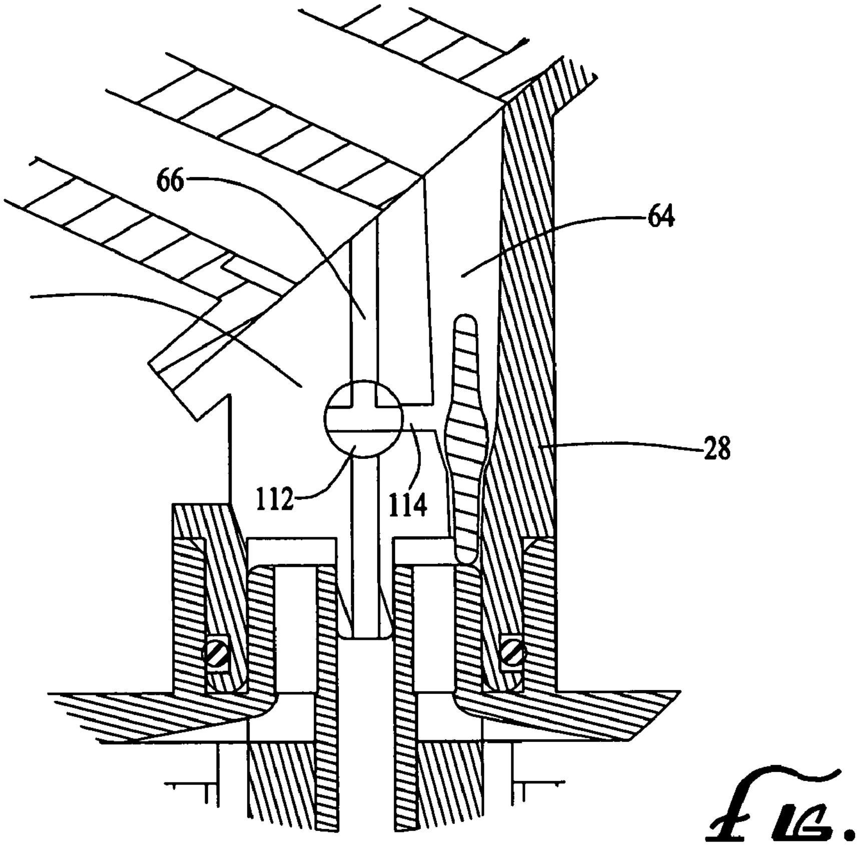
FIG. 9 is a cross sectional view of a portion of a dispensing system according to a further embodiment, where diverter valve is in a bypass position.
Figure 10:
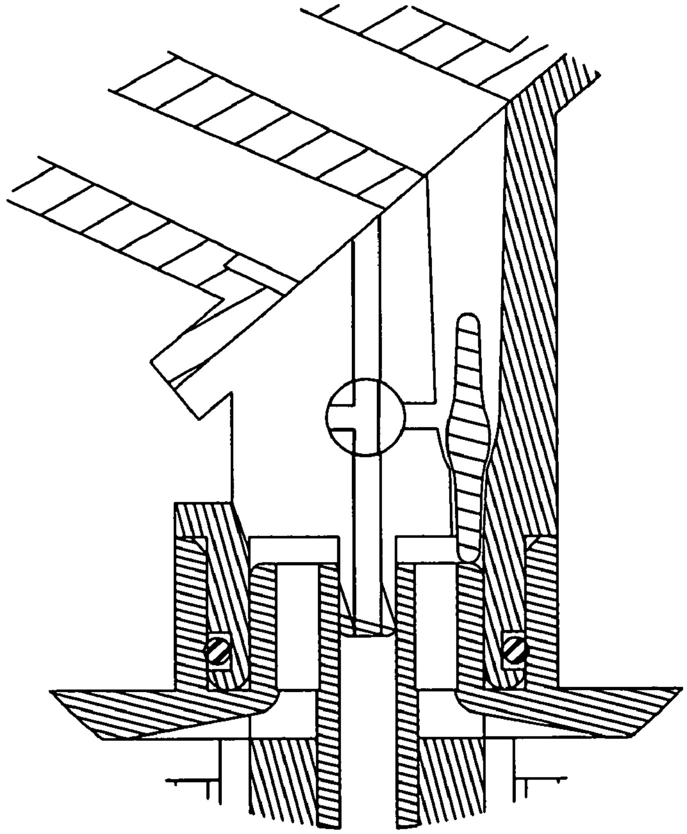
FIG. 10 is a cross sectional view of a portion of a dispensing system according to a further embodiment, where diverter valve is in an open position.

In further embodiments as shown in FIGS. 9 and 10, the volume control valve 70 may be replaced with a diverter valve 112. The diverter valve 112 has two positions (controlled by the knob 72), including a bypass position as shown in FIG. 9 and an open position as shown in FIG. 10. In the bypass position, the diverter valve 112, opens fluid communication through a bypass passage 114 extending between the passages 64 and 65 in the second extension member 28 and, at the same time, closes communication between the container 80 and the passage 65. In the open position, the valve opens the fluid communication path between the container 80 and the passage 65, but closes the bypass passage 114. In this regard, when a user desires to remove a flask 20 (for example, for replacement) or simply desires to not use material from the flask 20, the user may turn the diverter valve 112 into the bypass position (FIG. 9) and cause water to flow through the passage 64 to the bypass passage 114, through the bypass passage 114, to the passage 66 and back through the passage 62 to the small diameter portion 49 of the first tube member 14. As a result, any soap residue (or residue of other material from the container 80) that may be within the passages 66 and 62 may be quickly washed away by the bypass flow through those passages.

While embodiments are described above in the context of a dispenser for a shower, other embodiments may be employed as a dispenser for other fluid-flow contexts. In particular, embodiments of the invention may be configured to connect in any suitable fluid flow system, for dispensing material (form container 80) into a fluid flow.

What is claimed is:

1. A dispenser system for connection to a fluid flow pipe through which a fluid may flow, the dispenser comprising:

a first tube member having at least one fluid flow passage therethrough, the first tube member having an inlet configured for connecting to and receiving a fluid flow from a fluid flow pipe and conveying fluid through the at least one fluid flow passage in a fluid-flow direction, the at least one fluid flow passage including a restrictor passage having a first portion and a second portion downstream of the first portion in the fluid-flow direction, the first portion having a first fluid pressure and the second portion having a second fluid pressure that is less than the first fluid pressure, upon fluid being conveyed through the restrictor passage;

a flask having an enclosed interior volume;

a pressure-deformable container held within the interior volume of the flask, the pressure-deformable container having an interior first volume for holding a flowable material, the flask and the deformable container defining a second volume within the flask but external to the deformable container; and a connection structure for connecting the first volume in fluid-pressure communication with the second portion of the restrictor passage and for connecting the second volume in fluid-pressure communication with the first portion of the restrictor passage, the connection structure being rotatably coupled to the first tube member, for rotation about at least a portion of the restrictor flow passage after the first tube member is connected to the fluid flow pipe;

wherein the at least one fluid flow passage through the first tube member comprises at least one bypass passage, for allowing fluid to flow through the first tube member and bypass the restrictor passage in the first tube member.

2. A dispenser system as recited in claim 1, wherein the at least one bypass passage comprises a plurality of bypass passages arranged around the restrictor passage.

3. A dispenser system as recited in claim 1, wherein the at least one bypass passage comprises three bypass passages substantially parallel to the restrictor passage and arranged around the restrictor passage at about 120 degree intervals.

4. A dispenser system as recited in claim 1, wherein the connection structure comprises a second tube member disposed around the first tube member and rotatable relative to the first tube member.

5. A dispenser system as recited in claim 1, wherein the first tube member includes first and second annular grooves arranged in fluid-pressure communication with the first and second portions, respectively, of the restrictor passage, and wherein the connection structure comprises:

a second member disposed for rotation in a circumferential path of motion around the first tube member, the second member including first and second fluid-pressure communication passages arranged in fluid-pressure communication with the first and second annular grooves of the first tube member throughout the circumferential path of motion of the second member relative to the first tube member.

6. A dispenser system as recited in claim 1, wherein the second member comprises a second tube member disposed around the first tube member and an extension member extending from the second tube member, the extension member including a flask connection end for connecting to the flask.

7. A dispenser system as recited in claim 1, wherein the connection structure and the flask include a releasable connector for selectively coupling and de-coupling the flask to the connector structure.

8. A dispenser system as recited in claim 7, wherein the releasable connector comprises at least one clamp.

9. A dispenser system as recited in claim 7, wherein the releasable connector comprises a threaded connector.

10. A dispenser system as recited in claim 7, further comprising at least one additional flask for allowing a user to interchange one flask for another in the system.

11. A dispenser system as recited in claim 1, wherein the flask comprises a flask body and a flask cover removably connectable to the flask body, the flask cover including a keyed connection portion;

the pressure-deformable container includes a keyway portion for mating with the keyed connection portion of the flask cover.

12. A dispenser system as recited in claim 11, wherein the keyed connection portion of the flask cover and the keyway portion of the pressure-deformable container include at least one of a mating groove and protrusion, mating non-circular cross-sectional shapes, or a combination of a mating groove and protrusion and mating non-circular cross-sectional shapes.

13. A dispenser system as recited in claim 1, wherein the connection structure comprises:

an extension member including a flask connection end for selectively coupling and de-coupling the flask thereto;

a first fluid-pressure passage in the extension member, the first fluid-pressure passage connected in fluid-pressure communication with the first portion of the restrictor passage of the first tube member; and a valve disposed within the first fluid-pressure passage for blocking fluid-flow from the first fluid-pressure passage in the event that the flask decouples from the extension member.

14. A dispenser system as recited in claim 13, wherein the connection structure further comprises:

a second fluid-pressure passage in the extension member, the second fluid-pressure passage connected in fluid-pressure communication with the second portion of the restrictor passage of the first tube member; and a volume control valve for manually adjustable volume control disposed within the second fluid-pressure passage having a manual actuator and an off position in which fluid-pressure through the second fluid-pressure passage is blocked.

* * * * *